INVENTORS
ROBERT A. MERRILL
HENRY S. MIKA
BY
Irwin M. Lewis
ATTORNEY.

INVENTORS
ROBERT A. MERRILL
HENRY S. MIKA
BY
Irwin M. Lewis
ATTORNEY.

Dec. 13, 1955  R. A. MERRILL ET AL  2,726,922
CONTROL SYSTEM
Filed Oct. 6, 1952  7 Sheets-Sheet 4

INVENTORS
ROBERT A. MERRILL
HENRY S. MIKA
BY Irwin M. Lewis
ATTORNEY.

Dec. 13, 1955  R. A. MERRILL ET AL  2,726,922
CONTROL SYSTEM
Filed Oct. 6, 1952  7 Sheets-Sheet 5

INVENTORS
ROBERT A. MERRILL
BY HENRY S. MIKA

Irwin M. Lewis
ATTORNEY.

INVENTORS
ROBERT A. MERRILL
HENRY S. MIKA
BY
ATTORNEY.

United States Patent Office 2,726,922
Patented Dec. 13, 1955

2,726,922

CONTROL SYSTEM

Robert A. Merrill, Detroit, and Henry S. Mika, Birmingham, Mich., assignors to United States Rubber Company, New York, N. Y., a corporation of New Jersey Application October 6, 1952, Serial No. 313,282

20 Claims. (Cl. 18—2)

This invention relates to a control system for a series of conveyors used in conveying continuously extruded plastic material from an extruding die to a severing mechanism.

It is common practice in conveyor installations of this type to make the conveying system of considerable length to allow the freshly extruded material to cool and set before it reaches the severing mechanism where it is cut into short predetermined lengths. It is also common practice to include cooling baths in a line of separate conveyors to increase the rate of cooling.

When the plastic material is extruded, the material is quite soft and the speed of the immediate take-away conveyor which carries the material from the die determines the weight of the stock per unit of length. If the speed of the take-away conveyor is increased, the weight of the material per unit of length will be decreased because it is stretched by the conveyor as it is pulled from the extruding die. It is therefore necessary in controlling the weight of the extruded material to accurately control the speed of the take-away conveyor. It is one object, therefore, of the present invention to provide a mechanism for continuously weighing the extruded material and a control system for increasing or decreasing the speed of the conveyors in the event that the weight of the material varies from a predetermined desired standard weight.

As the material is transported by the series of conveyors through the various baths, it is cooled and in cooling undergoes considerable shrinkage. If all the conveyors in the series are operated at the same speed, then the conveyors remote from the extruding die will be operating at a linear speed greater than that at which the material is being supplied to them and they will stretch the material thereby inducing tensile stresses into the material or they may actually permanently stretch the material. If the material is under tensile stress when it reaches the severing mechanism, it is impossible to cut the material accurately to a predetermined length because when it is cut and removed, it will retract to a shorter length due to these tensile stresses. Because of the unpredictable nature of plastic materials, and in particular rubber, it is impossible to predict the amount of shrinkage, so that a correction factor can be applied in cutting the material. It is a further object, therefore, of the present invention to provide a control system which will continuously measure the tension of the material at a plurality of points along the conveyor line and increase or decrease the linear speed of the individual conveyors to maintain the material at a predetermined desired tension throughout its travel.

In addition to being able to accurately cut the material to predetermined lengths, it is also important that these lengths be of a predetermined weight. Because of the unpredictable amount of shrinkage in the material in its travel to the severing mechanism, it is impossible to predetermine accurately what the change of weight per unit of linear measurement of the stock will be due to this shrinkage. However, the shrinkage will be proportional to the difference in speed of the first and last conveyors, if the conveyors are operated at speeds that will maintain the material at substantially zero tension. It is, therefore, a still further object of the present invention to provide a control system which will utilize this difference in speed of the first and last conveyors in applying a compensating factor in the weight control system so that the cut lengths will be of the desired standard weight.

It is a still further object of the present invention to provide an integrated control system for a series of conveyors used in conveying continuously extruded plastic material, such as rubber, from an extruding die to a severing mechanism, which will accurately and automatically control the weight of and the tension in the extruded material and will apply a factor to compensate for the weight change due to shrinkage during the movement of the extruded material from the extruding die to the severing mechanism, so that lengths severed from the material will be of a desired length and weight.

A still further object of the invention is to provide an integrated control system for a series of conveyors used in conveying continuously extruded rubber tread stock for pneumatic tires from an extruding die commonly known as a tubing mill to a severing mechanism; which control system will acurately and automatically control the weight of and the tension in the tread stock and will apply a factor to compensate for the weight change due to shrinkage during the movement of the tread stock from the tubing mill to the severing mechanism, so that lengths severed from the continuous strip of stock will be of uniform length and weight.

Other objects and advantages of the present invention will become apparent from the following description when read in conjunction with the accompanying drawings; wherein Fig. 1 is a schematic drawing of a typical conveyor system for extruded plastic material to which the control system of the present invention may be applied, the drawing showing the location of the mechanical elements including the continuous weighing scale, the scale compensating mechanism, the conveyor motors, the tachometer generators, and the control selsyn transmitters of the control system of the present invention;

Figure 1:
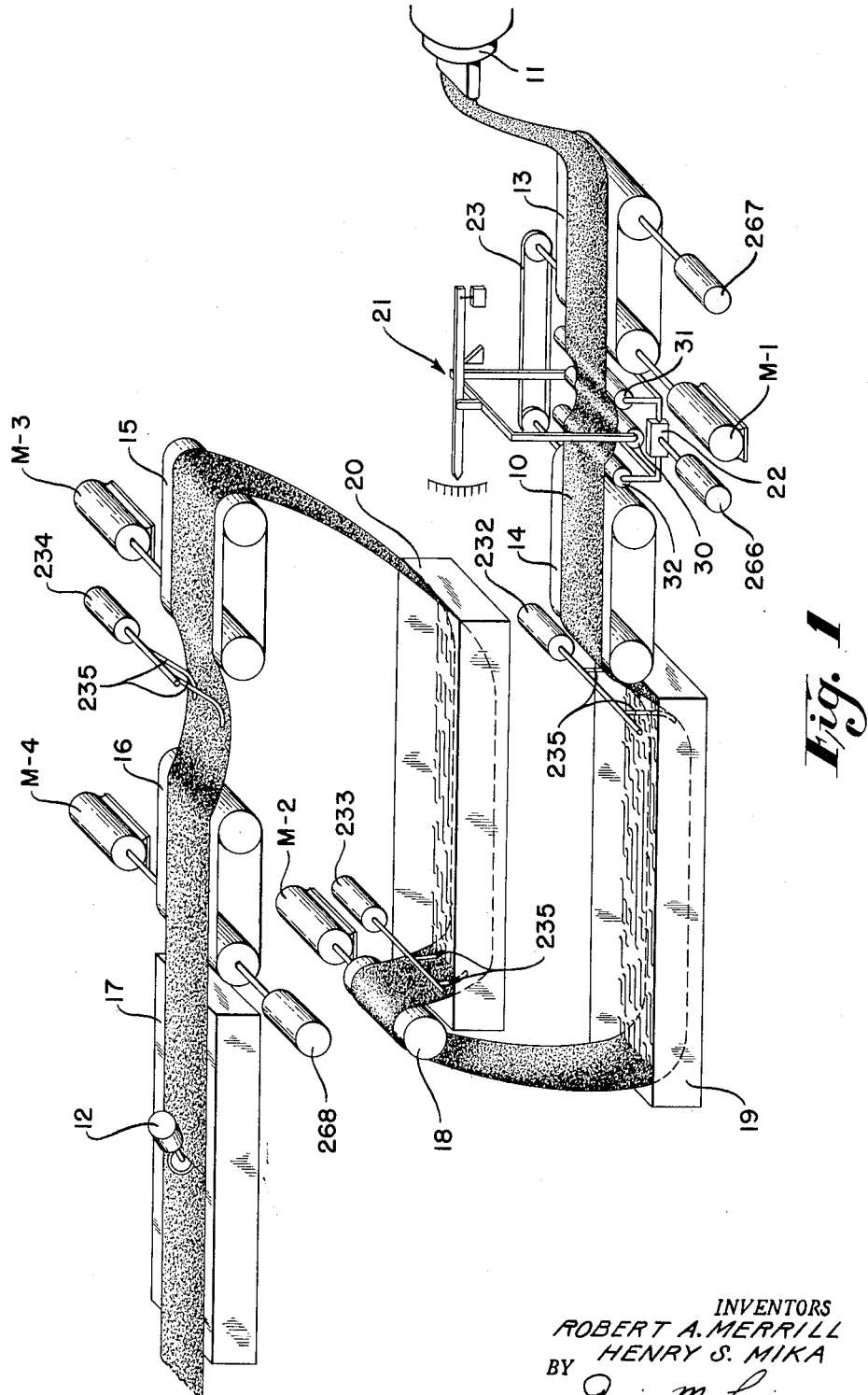

Referring to Fig. 1 of the drawings, there is shown a typical conveyor system for conveying an extruded strip 10 of plastic material, such as rubber, from an extruding die 11 to a severing mechanism 12. In the particular system shown, there are four individual belt conveyors designated as 13, 14, 15 and 16 and one conveyor roller designated as 18.

The conveyor system shown is of a type commonly used in the extrusion of rubber tread stock for pneumatic tires commonly known as "tubing." The control system of the present invention which will hereinafter be described is particularly useful in the extruding of such stock as it will accurately control the weight of the stock per unit of length, and deliver the stock to the severing mechanism at substantially zero tension so that the stock may be accurately cut into sections of predetermined length and weight. In the manufacture of tires the tread stock is wrapped around the tire carcass while it is on a tire building drum and if the tread stock is not of the proper length, it is necessary to either trim the stock if it is too long or stretch the stock if it is too short in order to fit it to the drum. These extra operations are eliminated by the present invention, inasmuch as the stock may be accurately cut to the proper length and weight.

Between conveyor 14 and roller 18 there is a cooling tank 19 and between roller 18 and conveyor 15 there is a second cooling tank 20. A cooling liquid, such as water, is circulated in the tank 19 and 20 to accelerate the rate of cooling of the extruded strip 10 as it is passed therethrough.

Conveyors 13 and 14 are spaced apart sufficiently to accommodate between them a continuous weighing scale 21 and a scale compensating mechanism 22, as will be later described. Conveyor 14 is driven from, and at the same speed as, conveyor 13 by a chain drive 23. Conveyor 13 is driven by a D. C. motor M-1. The conveyor roller 18 is driven by a D. C. motor M-2, conveyor 15 by a D. C. motor M-3, and conveyor 16 by a D. C. motor M-4.

The control system for the series of conveyors, for the purpose of explanation, may be divided into three headings which may be entitled according to their primary functions as, "Weight control," "Loop or Tension control," and "Scale compensator." These divisions of the combination control system will be described under these headings and in the order given.

Weight control

Figure 2:
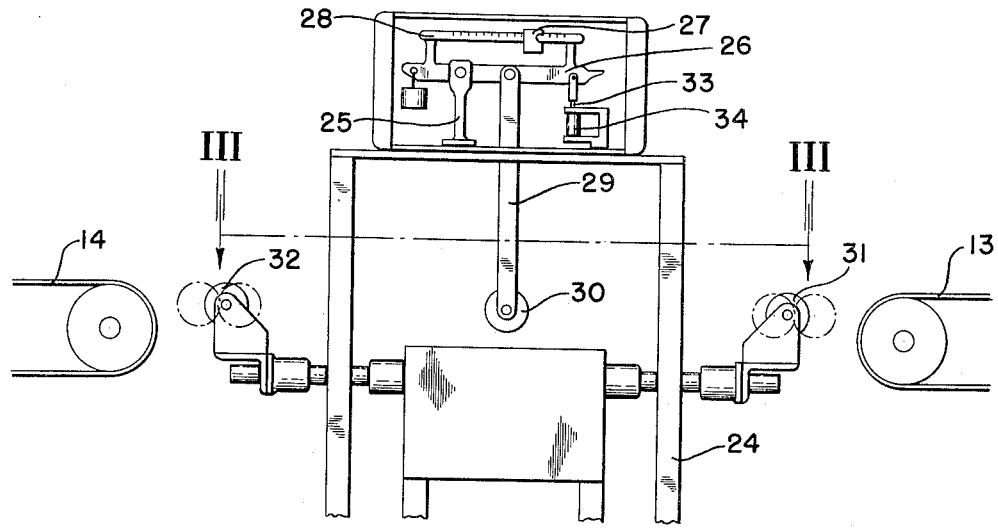
Fig. 2 is an elevational view showing the mechanical features of the continuous weighing scale and scale compensating mechanism.
Figure 3:
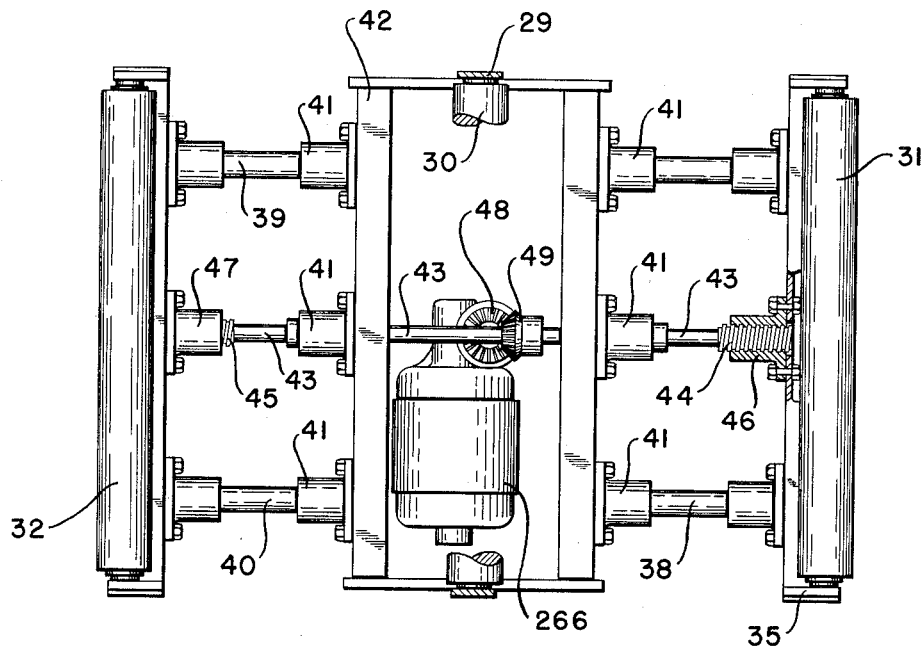
Fig. 3 is a view taken on line III—III of Fig. 2 showing the mechanical details of the scale compensating mechanism.

The weight control includes a continuous weighing scale 21, schematically shown in Fig. 1 and in detail in Figs. 2 and 3.

Referring to Fig. 2, the scale 21 includes a supporting frame 24, a fulcrum 25, and a balance beam 26 pivoted on the fulcrum 25. A slidable counter-balancing weight 27 is carried by a scale 28 secured to the top of the balance beam 26. A harness 29 is pivotally secured to the beam 26 and carries a roller 30 at its free end. The roller 30 is positioned at the geometric center between two supporting rollers 31 and 32. The spacing between the rollers 31 and 32 is adjustable as will be later brought out in the description of the scale compensating system.

The strip of extruded material 10 passes from the conveyor 13 over the supporting rollers 31, over scale roller 30, over supporting roller 32 onto conveyor 14. Sliding weight 27 is adjusted to balance the scale at the desired weight per unit length of the strip of material. If the material is heavier than the desired weight then the strip of material between the two supporting rollers resting on the scale roller 30 will deflect the balance beam downwardly and if the material is lighter than desired, the balance beam will move upwardly.

The free end of the balance beam is attached to a movable iron core 33 of a differential type transformer 34. The transformer 34 has two secondary windings. When the iron core 33 is in the geometric center of the transformer, the induced voltages in the two secondary windings are equal but opposed so that there is no voltage output. If the iron core is moved up or down away from the geometric center of the transformer by the balance beam 26, thereby indicating a deviation from the desired weight, the voltage output of the secondary windings will be proportionate to the distance the core is moved from the geometric center and therefore the deviation from standard weight of the strip 10; and the instantaneous polarity of the output voltage will depend on the direction of movement of the iron core.

In broad terms, the weight control circuit takes the voltage output from the transformer 34 and feeds it to an amplifying circuit. The amplified voltage is then applied to drive a servomotor in one direction or the other depending upon the instantaneous polarity of the voltage. The servomotor drives a slider on a potentiometer which is connected in series with the field windings of a D. C. generator. All the conveyor motors M-1, M-2, M-3 and M-4 are D. C. motors and are driven off the output of the D. C. generator. When the slider on the potentiometer is moved, the resistance in the field circuit of the generator is increased or decreased, as the case may be, thereby decreasing or increasing the output of the direct current generator and the speed of all the conveyor motors. In this manner the speed of the motors is varied in accordance with the weight deviation from a desired standard of the extruded material as determined by the movement of the iron core of the transformer 34. If the speed of the conveyor motors is increased, the extruded material is stretched slightly as it leaves the extruding die 11, thereby decreasing the weight per unit length thereof. If the speed of the conveyor motors is decreased, the weight per unit length of the extruded material is slightly increased.

Figure 4:
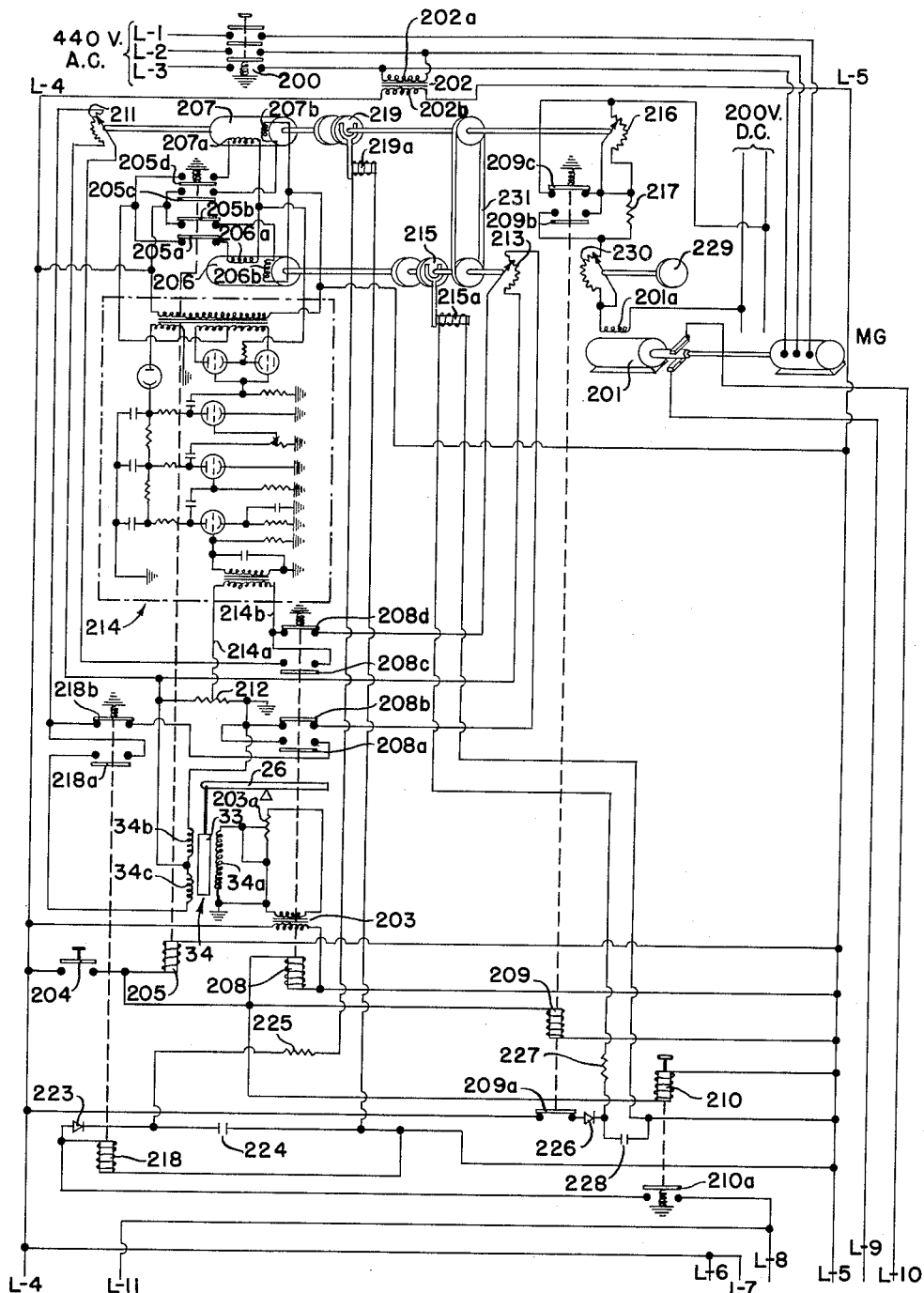
Fig. 4 is an elementary wiring diagram showing a portion of the electrical circuit of the control system.

The weight control circuit is shown in detail in the diagram of Fig. 4. In this diagram as well as the other wiring diagrams, all switches are shown in their non-actuated position and all solenoids are shown in their non-energized condition. Operation of the conveyor system and energization of the control circuit is initiated by manually operating push button switch 200 which connects three phase, A. C. motor MG with a 440 volt source (not shown) by means of wires L-1, L-2 and L-3. Motor MG drives D. C. generator 201 which in turn supplies direct current to drive D. C. conveyor motors M-1, M-2, M-3 and M-4 (Fig. 6) by means of feed lines L-9 and L-10.

Closing of switch 200 also energizes the primary winding 202a of a step down transformer 202. Secondary winding 202b is connected across conductors L-4, L-5 to provide 110 volts A. C. This voltage is further reduced to 6 volts for certain of the control circuits by means of a transformer 203. The 6 volts is applied to the primary winding 34a of the differential transformer 34. A manually adjustable rheostat 203a is provided in the circuit for the primary winding 34a for accurately setting the voltage. Transformer 34 has two secondary windings 34b and 34c and the movable iron core 33 attached to the free end of the balance beam 26 as previously described.

The weight control circuit may be either manually operated as will be later described or automatically operated. Automatic operation is initiated by closing switch 204. Closing switch 204 completes a circuit across power supply lines L-4 and L-5 to energize a control relay 205. Energization of control relay 205 opens normally closed contacts 205a and 205b in the circuits to the field windings 206a and 206b of a servomotor 206 and closes normally open contacts 205c and 205d in the field windings 207a and 207b of a servomotor 207.

Closing of switch 204 also energizes control relays 208, 209 and a timer 210. Energization of control relay 208 closes normally open contacts 208a and 208c and opens normally closed contacts 208b and 208d. Closing of contacts 208a connects a potentiometer 211 in parallel across a resistor 212 through normally closed contacts 218b. Opening of contacts 208b disconnects a potentiometer 213 from across the resistor 212. Closing of contact 208c connects the slider of potentiometer 211 with an amplifier 214. Opening of contacts 208d disconnects the slider of potentiometer 213 from the amplifier 214.

Energization of control relay 209 opens normally closed contacts 209a and 209c and closes normally open contacts 209b. Opening contacts 209a de-energizes a clutch operating solenoid 215a to release a clutch 215 which connects servomotor 206 with the slider of potentiometer 213. Closing of contacts 209b connects the slider of a rheostat 216 in the field circuit 201a of generator 201. Opening of contacts 209c disconnects a resistor 217 from the field circuit of the generator 201. The field circuit is supplied by a 200 volt D. C. supply source.

Energization of timer 210 closes normally open contacts 210a but interposes a time delay in the closing of the contacts. This time delay is inserted to permit the extrusion of the material to become stabilized before the automatic weight control takes over. Closing of contacts 210a completes a circuit to energize a control relay 218 and clutch operating solenoid 219a of a clutch 219, if at the same time microswitch 220 (Fig. 5) is also closed. Microswitch 220 is operated by a cam plate 221 which is driven at a reduced speed by means of a gear set 222 from the conveyor 13. The reduction in speed of the cam plate 221 is such that microswitch 220 will be actuated for about 10 seconds and nonactuated for a period sufficient in length to allow the extruded material 10 to move from the extruding die 11 to a point just beyond the weighing scale 21.

When contacts 210a and microswitch 220 are both closed, control relay 218 and clutch operating solenoid 219a are energized. Energization of clutch operating solenoid 219a engages clutch 219 to connect servomotor 207 with the slider of potentiometer 216. Solenoid 219a is direct current operated, and an appropriate rectifying circuit including a selenium rectifier 223, capacitor 224, and resistor 225 is provided.

Energization of control relay 218 closes normally open contact 218a and opens normally closed contacts 218b. Opening of contacts 218b disconnects potentiometer 211 from across resistor 212 and closing of contact 218a places it in parallel with the secondary winding 34c of transformer 34.

During the ten second interval while microswitch 220 is closed, the circuit is in condition to take a weight measurement and apply a correction to the speed of the conveyors. If the iron core 33 is in the geometric center of the transformer 34, there is induced in the secondary windings 34b and 34c, equal but opposed voltages and there is no resultant output voltage and consequently no correction is made to the speed of the conveyors. If, however, the iron core 33 is moved from the geometric center of the transformer 34 by the weighing scale 21, thereby indicating a deviation from standard weight, the voltage induced in the two secondary windings 34b and 34c will not be equal. There will, therefore, exist a voltage difference between the slider of potentiometer 211 and the center tap of resistor 212, inasmuch as the potentiometer 211 is connected in parallel across winding 34c and resistor 212 is connected across winding 34b. The difference in voltage, which has an instantaneous polarity depending on the direction of movement of the iron core, is fed into the amplifier 214 by means of conductors 214a and 214b. Power is supplied to the amplifier by the 110 volt supply lines L–4 and L–5. Amplifier 214 is of a conventional type well known to those skilled in the art and includes a voltage amplifying stage and a power amplifying stage. A simplified circuit diagram of the amplifier 214 is included in Fig. 4 for the purpose of illustration. The amplifier 214 amplifies the signal voltage and feeds it to the field winding 207a of servomotor 207 through previously closed contacts 205d of control relay 205 which was energized on manually closing switch 204. Field winding 207b was connected across 110 volt lines L–4 and L–5 by the closing of contacts 205c.

Servomotor 207, as well as servomotor 206, is of the induction type so that the phase relation between the current in the two field windings determines the direction of rotation of the motor. The phase relationship between the field winding 207a and 207b is determined by the instantaneous polarity of the signal voltage fed into the amplifier 214 by the secondary windings 34b and 34c. The instantaneous polarity of the signal voltage in turn is determined by the direction of movement of the iron core 33. If the core is moved in one direction from geometric center, the servomotor will therefore turn in one direction and if the core moves in the opposite direction the servomotor will turn in the opposite direction. As servomotor 207 rotates it moves the slider of the potentiometer 211, which is connected thereto, an amount to restore electrical balance between it and the center tap of the resistor 212. At the same time servomotor 207 moves the slider of potentiometer 216 which is connected to the servomotor 207 by means of clutch 219, which had been previously engaged by clutch operating solenoid 219a.

Movement of the slider of potentiometer 216, which had been previously inserted in the field circuit of the generator 201 by closing contacts 209b and opening contacts 209c of control relay 209, varies the resistance in the field of the generator 201 and therefore the output thereof. The variation of the output of generator 201 varies the speed of all the conveyor motors connected across lines L–9 and L–10, so that they will operate at the proper speed to give the desired weight and return the balance beam 26 of the weighing scale 21 back to the center of the scale.

When microswitch 220 is released, control relay 218 and clutch operating solenoid 219a are de-energized. When control relay 218 is de-energized, contacts 218a open and contacts 218b close. This connects potentiometer 211 in parallel with resistor 212 across the secondary winding 34b of transformer 34. As so connected, there will be a voltage difference between the slider of potentiometer 211 and the center tap of the resistor 212, inasmuch as the slider of potentiometer 211 had been previously moved by the servomotor 207. This voltage difference is fed into the amplifier 214 and as amplified it drives servomotor 207 to reset slider of the potentiometer 211 to the center of the range so that there will be electrical balance between it and the center tap of the resistor 212. The slider of potentiometer 216 does not move at this time because clutch 219 was de-energized when the clutch operating solenoid 219a was de-energized by the release of microswitch 220.

When microswitch 220 is again operated by cam plate 221, the cycle of weight measuring and correction is again repeated automatically if this is necessary as reflected by the position of the iron core 33 of the transformer 34.

If it is desired to control the weight of the extruded material manually, switch 204 is opened thereby de-energizing control relays 205, 208, 209 and timer 210.

De-energization of control relay 205 opens contacts 205d and 205c to disconnect the field winding 207a and 207b of servomotor 207, and closes contacts 205a and 205b to connect the field winding 206a of servomotor 206 to the amplifier 214 and 206b field windings across 110 volt lines L–4 and L–5.

De-energization of control relay 208 opens contacts 208a and 208c and closes contacts 208b and 208d. Opening of contacts 208c disconnects the slider of potentiometer 211 from the amplifier 214 and closing of contacts 208d connects the slider of the potentiometer 213 to the amplifier 214. Opening of contacts 208a disconnects potentiometer 211 from across the resistor 212 and closing contacts 208b connects the potentiometer 213 in parallel across the resistor 212.

De-energization of control relay 209 closes contacts 209a and 209c and opens contacts 209b. Opening of contacts 209b disconnects potentiometer 216 from the field circuit of generator 201 and closing of contacts 209c connects resistor 217 in series with the field circuit of generator 201. Closing of contacts 209a energizes clutch operating solenoid 215a to engage clutch 215. Solenoid 215a is direct current operated and an appropriate rectifying circuit including a selenium rectifier 226, resistor 227 and capacitor 228 is provided.

De-energization of timer 210 opens contacts 210a. Opening of contacts 210a de-energizes control relay 218 and the clutch operating solenoid 219a. De-energization of control relay 218 opens contacts 218a and closes contacts 218b. Opening of contacts 218a disconnects potentiometer 211 from across the secondary winding 34c of the transformer 34. Closing of contacts 218b would ordinarily connect potentiometer 211 across the resistor 212 but does not do so because contacts 208a are open at this time. De-energization of clutch operating solenoid 219a releases clutch 219 to disconnect servomotor 207 from the slider of potentiometer 216.

The speed of the conveyor motors and therefore the weight per unit length of the extruded material is varied by manually turning handle 229 which moves the slider on a rheostat 230 which is connected in the field circuit of the generator 201. Movement of the slider of rheostat 230 varies the resistance in the field circuit 201a of the generator 201 and thereby varies the output thereof and the speed of all the conveyor motors. By watching the balance beam 26 of the weighing scale 221 and turning handle 229, the weight of the extruded material may be kept at the proper weight.

The sliders of potentiometer 213 and rheostat 216 are connected together by means of a gear or chain drive 231 so that both are moved simultaneously. If the slider of potentiometer 213 and therefore the slider of rheostat 216 are not in the center of the range there will be a voltage difference between the slider of potentiometer 213 and the center tap of resistor 212, inasmuch as the potentiometer 213 is now connected in parallel with resistor 212 and the slider of potentiometer 213 is connected to the amplifier 214. This difference in voltage is fed to the amplifier 214 and as amplified is applied to the field windings 206a of servomotor 206 to drive this motor in one direction of the other depending on the instantaneous polarity of the voltage supplied to the winding 206a by the amplifier 214. Winding 206b is connected across 110 volt lines L-4, L-5. Servomotor 206 is connected to the slider of potentiometer 213 by means of clutch 215 and resets the slider of potentiometer 213 to the center range to restore electrical balance between it and the center tap of the resistor 212. At the same time the slider of rheostat 216 is reset to the center of the range by the gear or chain drive 231, so that when switch 204 is closed to give automatic operation, the control will have been entirely reset to center of range.

*Loop or tension control*

Referring to Fig. 1, the loop or tension control includes three selsyn transmitters 232, 233 and 234. Each of the selsyn transmitters is positioned at a point in the conveyor line where the extruded strip material 10 is unsupported. Selsyn transmitter 232 is positioned adjacent the point where the extruded material 10 leaves the conveyor 14; selsyn transmitter 233 is positioned adjacent the delivery side of the conveyor roller 18; and selsyn transmitter 234 is positioned between the conveyors 15 and 16. At each of these points the material sags and forms a loop. The amount of sag or size of the loop is proportional to the tension in the extruded material at that point. The larger the depth of the loop the less the tension, and the smaller the depth of the loop the greater the tension.

The shaft of each of the selsyn transmitters has secured thereto a pair of feelers 235 which engage the extruded material and are held in contact therewith by the force of gravity. As the tension in the extruded material increases or decreases and the size or depth of the loop correspondingly decreases or increases, the feelers 235 are rotated upwardly or downwardly. The feelers 235 in turn, rotate the shaft and rotor of the selsyn transmitter to which they are attached.

As will hereinafter be described in detail, the position of the rotor of the individual selsyn transmitters is compared electrically with the position of the rotor of a control transformer and if they are not in electrical alignment, a signal voltage is induced in the rotor winding of the control transformer. This signal voltage, which is therefore proportionate to the amount of rotation of the rotor of the control selsyn transmitter, is fed into an amplifier which in turn drives a servomotor in one direction or the other depending upon the instantaneous polarity of the voltage.

The servomotor moves a slider on a rheostat in each of the field circuits of the conveyor motors M-2, M-3 and M-4 to increase or decrease the speed of the individual conveyors that they drive. By a special clutch arrangement, movement of the rotor of the first selsyn transmitter, namely, selsyn transmitter 232 will increase or decrease the speed of conveyor motors M-2, M-3 and M-4. Movement of the rotor of the second selsyn transmitter, namely, selsyn transmitter 233, will increase or decrease the speed of conveyor motors M-3, M-4 and movement of the rotor of selsyn transmitter 234 will increase or decrease the speed of only conveyor motor M-4.

Figure 5:
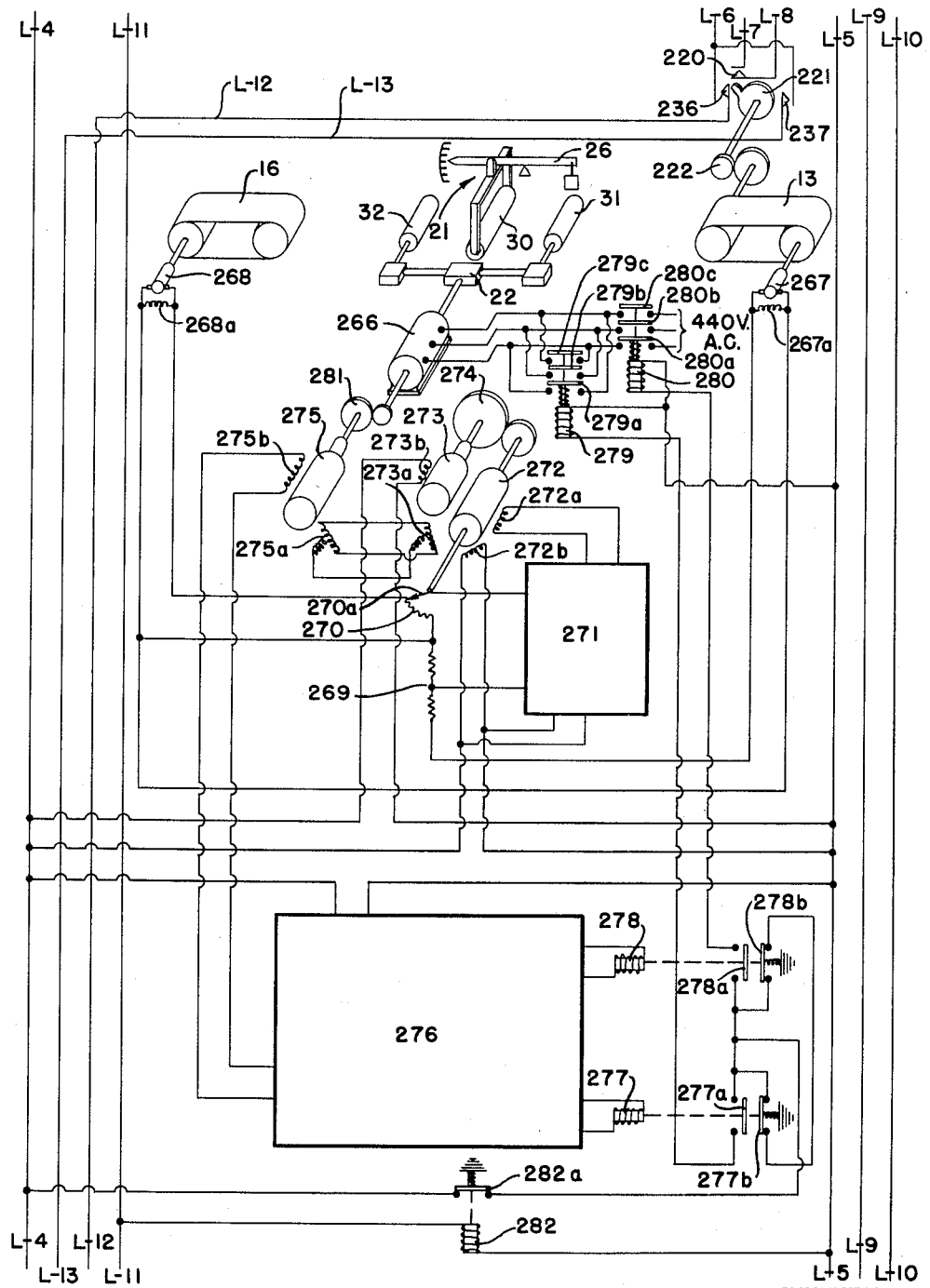
Fig. 5 is a continuation of the electrical diagram of Fig. 4.
Figure 6:
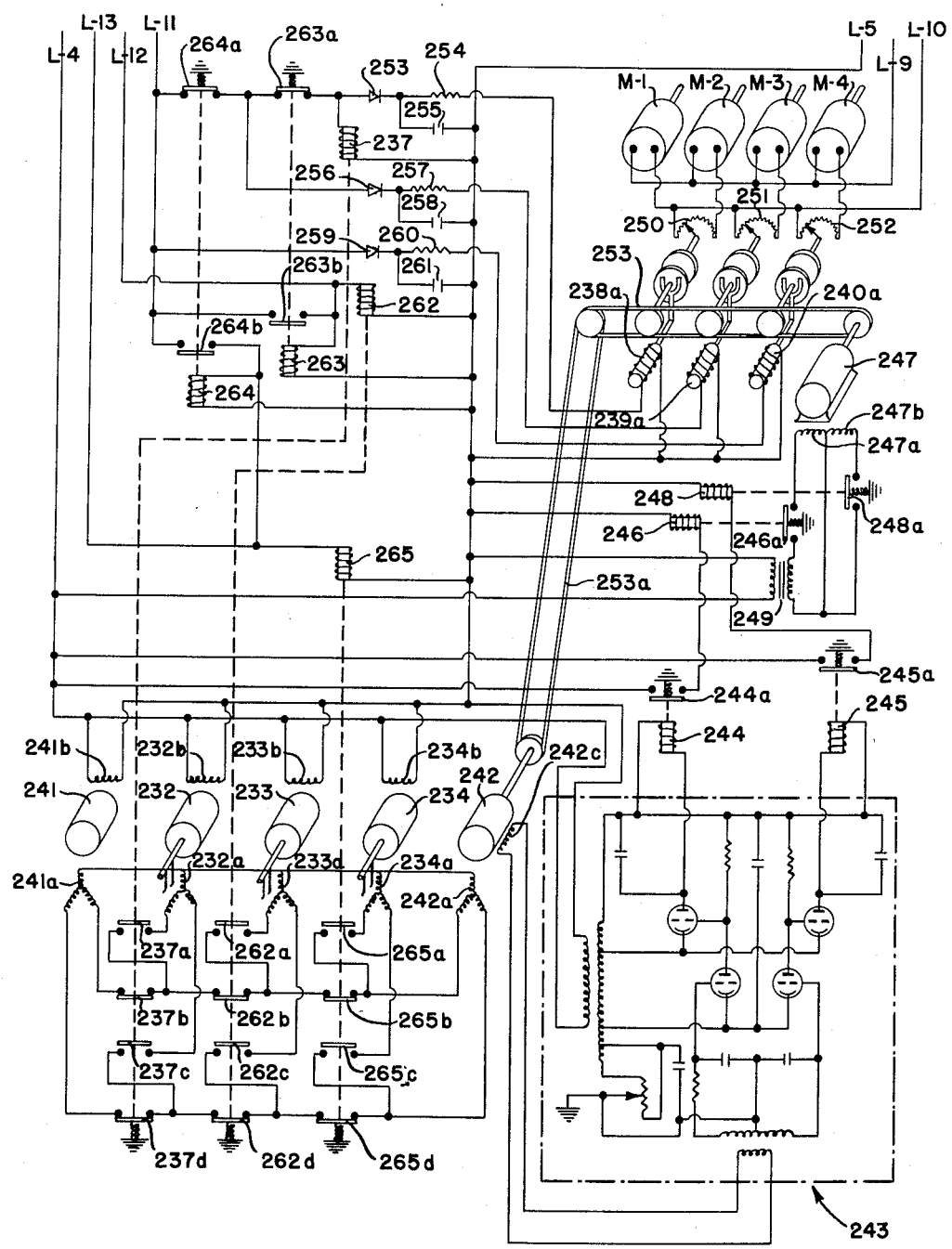
Fig. 6 is a continuation of the electrical diagram of Fig. 5.

The loop control circuit is shown in detail in Fig. 6. Each of the selsyn transmitters 232, 233 and 234 are sequentially connected into the control circuit by the sequential actuation of microswitches 220, 236 and 237 (Fig. 5) by the cam plate 221.

Actuation of micro-switch 220 completes the circuit between lines L-4, L-11 and L-5 to energize control relay 237 and clutch operating solenoids 238a, 239a and 240a.

Energization of control relay 237 closes normally opened contacts 237a, 237c and opens normally closed contacts 237b and 237d. Opening of contacts 237b and 237d disconnects the field windings 241a of a reference selsyn 241 from the field windings 242a of control transformer or selsyn receiver 242a and closing contacts 237a and 237c connects the field windings 232a of selsyn transmitter 232 to the field windings 242a of control transformer 242.

If at this instance, the rotor of the selsyn transmitter 232 is not in electrical alignment with the rotor of the control transformer 242, thereby indicating a variation of the tension of the extruded material from the standard set by the position of the rotor of selsyn 241, a signal voltage will be induced in the rotor winding 242c of the transformer 242. The signal voltage is fed into an amplifier 243. Amplifier 243 is of a conventional type well known to those skilled in the art. A simplified circuit diagram of amplifier 243 is included in Fig. 6 for the purpose of illustration. As is readily apparent to one skilled in the art, either control relay 244 or relay 245, which are connected to the output side of the amplifier, is energized depending upon the instantaneous polarity of the signal voltage fed into the amplifier. If the control relay 244 is energized, it closes contacts 244a to complete a circuit to energize a control relay 246. Energization of control relay 246 closes contacts 246a to complete the field circuit 247a of a servomotor 247 to drive the motor 247 in one direction.

If control relay 245 is energized, it closes contacts 245a to complete a circuit to energize control relay 248. Energization of control relay 248 closes contacts 248a to complete the field circuit 247b of servo motor 247 to drive the motor 247 in the other direction. Both field circuits are energized from lines L-4 and L-5 through transformer 249.

Servomotor 247 moves the sliders on rheostats 250, 251 and 252 in the field circuits of conveyor motors M-2, M-3 and M-4 respectively through a gear or chain drive 253 and clutches 238, 239 and 240. Each of the clutches, as previously described, was engaged when their respective operating solenoids 238a, 239a, and 240a were energized when micro-switch 220 was actuated by cam plate 221. Each of the solenoids 238a, 239a and 240a are direct current operated and an appropriate rectifying circuit is provided for each solenoid, including a selenium rectifier 253, resistor 254 and capacitor 255 for solenoid 238a; rectifier 256, resistor 257 and capacitor 258 for solenoid 239a; and a rectifier 259, resistor 260 and capacitor 261 for solenoid 240a.

Movement of the sliders of the potentiometers 250, 251 and 252 increases or decreases the resistance in the fields of each of the conveyor motors M-2, M-3 and M-4 and thereby increases or decreases the speed of the motors to correct the tension in the extruded material carried by the conveyors at the point contacted by the feelers of selsyn 232.

At the same time that servo motor 247 moves the sliders of the rheostats 250, 251 and 252, it also rotates the rotor of control transformer 242 in the appropriate direction by means of drive 253a until it is in electrical alignment with the rotor of the control selsyn 232. When it reaches this position of alignment, no voltage is induced in the secondary winding 242c and control relays 244, 245, 246, 248 are deenergized thereby opening the contacts thereof and stopping motor 247.

When micro-switch 220 is released, control relay 237 and all clutch solenoids 238a, 239a and 240a are de-energized. De-energization of control relay 237 opens contacts 237a and 237c and disconnects the field winding 232a of the selsyn transmitter 232 from the field windings 242a of control transformer 242 and closes contacts 237b and 237d to connect the field windings 241a of reference selsyn 241 to the field windings 242a of the control transformer 242. Reference selsyn 241 has a fixed, but adjustable rotor which is set to correspond in position to the rotors of the control selsyn transmitters when the extruded material is at the desired standard tension.

When the field windings 242a of the control transformer 242 are connected to the field windings 241a of the reference selsyn 241, if the rotors of each are out of alignment electrically, a signal voltage is induced in the rotor winding 242c. This signal voltage is fed into the amplifier 243 and motor 247 is again operated in one direction or the other depending upon whether control relay 244 or 245 is energized. At this time, however, the sliders of the rheostats 250, 251 and 252 are not moved by the motor 247 as clutches 238, 239 and 240 are not engaged. The rotor of the control transformer 242 is, however, rotated by the gear or chain drives 253 and 253a until it is in electrical alignment with the fixed rotor of the reference selsyn 241. When the rotor of the control transformer assumes electrical alignment with the rotor of the reference selsyn 241, there is no signal voltage induced in the rotor winding 242c and control relays 244, 245, 246 and 247 are deenergized and their respective contacts open to stop motor 247. This electrical comparison and resetting of the control transformer takes place each time that one of the micro-switches 220, 236 or 237 is released and before the next micro-switch is actuated, so that the control transformer is reset for the next comparison with the next control selsyn transmitter.

When the cam plate 221 actuates switch 236, a circuit is completed from L-4 through conductor L-12 to L-5 to energize control relays 262 and 263. Energization of control relay 263 opens normally closed contacts 263a to leave an open circuit to clutch solenoid 238a so that it will not be energized and closes contacts 263b to complete a circuit from L-4 through conductor L-12 to L-5 to energize clutch solenoids 239a and 240a, and thereby engage clutches 239 and 240.

Energization of control relay 262 opens contacts 262b and 262d to disconnect the field windings 241a of the reference selsyn 241 from the field windings 242a of the control transformer 242, and closes contacts 262a and 262c to connect the field windings 233a of control selsyn 233 to the field windings 242a of the control transformer 242.

If the rotor of control selsyn transmitter 233 is out of electrical alignment with the rotor of the control transformer 242, thereby indicating a deviation in tension of the extruded material from the desired standard, a signal voltage is induced in the rotor windings 242c of control transformer 242. This voltage signal is fed into the amplifier 243 and in a similar manner as described in connection with control selsyn transmitter 232, drives servomotor 247 in one direction or the other. Motor 247 moves the sliders of rheostats 251 and 252 to increase or decrease the speed of conveyor motors M-3 and M-4 to correct the tension in the extruded material at the point where the feelers of selsyn 233 contact the material. The slider of rheostat 250 is not moved because clutch 238 is not engaged at this time.

When micro-switch 236 is released, the rotor of control transformer 242 is again reset to be in electrical alignment with the stationary rotor of the reference transmitter 241 in the manner as previously described.

When micro-switch 237 is actuated, a circuit is completed from L-4 through conductor L-13 to line L-5 to energize control relays 264 and 265. Energization of control relay 264 opens normally closed contacts 264a to open the circuit to clutch solenoids 238a and 239a so that they will not be energized and closes normally open contacts 264b to complete a circuit to energize clutch solenoid 240a.

Energization of control relay 265 opens normally closed contacts 265b and 265d to disconnect the field windings 241a of reference selsyn 241 from the field windings 242a of control transformer 242 and closes normally open contacts 265a and 265b to connect the field windings 234a of control selsyn transmitter 234 to the field windings 242a of the control transformer 242. If at this time the rotor of the control selsyn transmitter 234 is not in electrical alignment with the rotor of the control transformer 242, a signal voltage is induced in the rotor winding 242c of the control transformer 242. This voltage is fed into the amplifier 243 and drives servomotor 247 in the same manner as previously described in connection with control selsyn generator 232. Motor 247 moves the slider of rheostat 252 and thereby increases or decreases the speed of conveyor motor M-4 to correct the tension in the extruded material at the point where the feelers of selsyn 234 contact the material. The sliders of rheostats 250 and 251 are not moved as clutches 238 and 239 are not engaged at this time.

When micro-switch 237 is released, the position of the rotor of the control transformer 242 is again compared with the position of the stationary rotor of the reference selsyn 241 and is reset in accordance therewith. Micro-switch 220 is then again actuated and the cycle of checking the tension in the extruded material and correcting the speed of the conveyors is again repeated. In this manner the tension in the extruded material is constantly checked at 3 points along the conveyor line and corrections made in the speed of the conveyors to maintain the desired tension in the material as it travels along the cooling path. If the control system is set to maintain the material at substantially zero tension then the amount of shrinkage of the material in its travel from the weighing scale to any particular tension checking point will be proportioned to the difference between the speeds of the conveyor adjacent the weighing scale and the conveyor against the particular checking point.

The rotor windings 241b, 232b, 233b and 234b of selsyn transmitters 241, 232, 233 and 234 are connected across lines L-4, L-5 to energize the respective windings.

Scale compensator

The scale compensator includes both mechanical and electrical elements. The mechanical elements which are best shown in Figs. 2 and 3 include the supporting rollers 31 and 32 previously referred to in conjunction with the description of the continuous weighing scale 21. Roller 31 is journaled at each end in a bracket 35 and roller 32 is journaled at each end in a bracket 36. Bracket 35 is secured to and supported by a pair of shafts 37 and 38 and bracket 36 is secured to and supported by a pair of shafts 39 and 40. Each shaft slides in identical bearings 41 secured to each side of a frame 42.

Rollers 31 and 32 are moved towards and away from each other by a shaft 43 which is threaded at each end as shown at 44 and 45. One end has a left hand thread and the other a right hand thread. Bracket 35 has secured thereto a threaded bushing 46 into which the threaded end 44 is threaded and bracket 36 has secured thereto a threaded bushing 47 into which the threaded end 45 is threaded. Rotation of shaft 43 in one direction or the other, therefore, moves the rollers 31 and 32 either towards or away from each other. Shaft 43 is rotated through beveled gears 48 and 49 by a motor 266.

The distance apart at which the rollers 31 and 32 are set affects the position of the balance beam 26 of the weighing scale 21, as it is the length of extruded material supported between these rollers which is weighed. If the scale is set to balance when the rollers are spaced apart a predetermined distance, then if the rollers are moved apart an additional distance, the balance beam 26 will move to indicate a heavier weight or if moved together the balance beam 26 will move to indicate a lighter weight.

The extruded material when it reaches the severing mechanism 12 will not have the same weight per unit of length that it had at the weighing scale. This is due to shrinkage of the extruded material as it is cooled during its travel along the conveyor system. Thus if a linear foot of the extruded material has a particular weight at the weighing scale, the same mass of material when it reaches the severing mechanism will have a smaller linear measurmeent and a foot of the extruded material when it reaches the severing mechanism will necessarily have a greater weight than a linear foot of the material at the weighing scale. This difference in weight of the extruded material will therefore be proportional to the percentage of shrinkage. If the per cent of shrinkage is known, a compensating correction can be introduced into the weighing scale by varying the distance between the rollers 31 and 32 so that the scale will balance when the weight of the extruded material is of the desired standard when it reaches the severing mechanism. Because of the unpredictable nature of plastic materials and in particular rubber, it is impossible to predict accurately the percentage of shrinkage.

As previously described in conjunction with the loop or tension control, if the tension control is set to maintain substantially zero tension in the extruded material, then the percentage of shrinkage of the material in its travel from the weighing scale to any particular tension checking point will be proportional to the difference between the speeds of the conveyor adjacent the weighing scale and the conveyor adjacent the particular checking point. Thus the total percentage shrinkage of the material in its travel from the weighing scale to the severing mechanism will be proportional to the difference in speeds between the conveyor adjacent the weighing scale and the conveyor adjacent the last checking point which delivers the material to the severing mechanism. As was also explained previously, the change in weight per unit of length is also proportional to the percentage of shrinkage. Thus in correlating these facts, the change in weight per unit of length of the material in its travel from the weighing scale to the severing mechanism will be proportional to the difference in speeds of the conveyor 13 adjacent to the weighing scale 21 and the conveyor 16 adjacent to the severing mechanism 12.

The scale compensator utilizes this difference in speeds to provide a compensating error in the weighing scale so that the weight of the extruded material will be of the desired standard weight per unit of length when it reaches the severing mechanism.

In utilizing this difference in speeds of the two conveyors, two tachometer generators 267 and 268 (Figs. 1 and 5) having field windings 267a and 267b are provided, the first being driven from the first conveyor 13, the second being driven from the last conveyor 16. The two tachometer generators are connected together electrically so that the resultant voltage of the two will be proportional to the difference in speed between the first and last conveyors and therefore the percentage of shrinkage in the extruded material in its movement from the first to the last conveyor. This voltage is amplified and is used to control the operation of motor 266 which varies the distance between the rollers 31 and 32 to compensate for the change in weight due to shrinkage. If the rollers are moved apart, the balance beam 26 moves downwardly and at the same time moves the iron core 33 of the transformer 34 in a direction to initiate the weight control circuit to increase the speed of all the conveyor motors to thereby decrease the weight per unit length of the extruded material.

As can be seen by reference to Fig. 5, which discloses the details of the control circuit, the output of tachometer generator 267 is connected in parallel with a resistor 269 and tachometer 268 is connected in parallel with potentiometer 270. The slider 270a of potentiometer 270 is connected to an amplifier 271 which is identical with the amplifier 214 of the weight control circuit and resistor 269 has a center tap connection with the amplifier 271. If the voltage generated by tachometer 268 is smaller than that generated by tachometer 267, then there will be a voltage difference between the slider of potentiometer 270 and the center tap of resistor 269, assuming that the slider of potentiometer 270 is at the center of the range. This voltage difference, which will be proportional to the shrinkage in the extruded material, is fed into the amplifier 271 and is amplified and applied to the field winding 272a of a servomotor 272 to drive this motor in one direction or the other depending upon the instantaneous polarity of the voltage. Field winding 272b of servomotor 272 is connected across 110 volt lines L-4, L-5. Motor 272 moves the slider of potentiometer 270 until electrical balance is reached between it and the center tap of the resistor 269.

At the same time servomotor 272 drives a selsyn transmitter 273 through reduction gearing 274. The field winding 273a of selsyn transmitter 273 is connected to the field windings 275a of a control transformer 275. If the rotor of the control transformer is not in the same electrical position as the rotor of the selsyn transmitter, a voltage signal will be induced in the rotor windings 275b of the control transformer. This voltage signal is fed into an amplifier 276, identical to the amplifier 243 of the loop control circuit, which energizes either of two control relays 277 or 278 depending upon the instantaneous polarity of the input signal. The polarity is determined by the direction in which the rotor of selsyn 273 and the slider 270a have moved.

If control relay 277 is energized, it closes contacts 277a and opens contacts 277b to complete a circuit to energize a control relay 279. Energization of control relay 279 closes normally open contacts 279a, 279b and 279c, to connect motor 266 with a 440 volt source (not shown) to drive the motor 266 in one direction. Operation of motor 266 moves the rollers 31 and 32 to provide a compensating error in the weighing scale 21 as previously described.

If control relay 278 is energized it closes contacts 278a and opens contact 278b to complete a circuit to energize the control relay 280. Energization of control relay 280 closes normally open contacts 280a, 280b and 280c to connect the motor 266 to a 440 volt power source to drive the motor in the opposite direction from that which resulted in closing contact 279a, 279b and 279c. Operation of the motor 266 in this direction moves the rollers 31 and 32 in the opposite direction to provide a compensating error in the scale 21.

When this compensating error is introduced into the weighing scale, the balance beam moves off balance and the speed of the conveyor motors are varied by the weight control circuit to correct the weight of the extruder material to bring the balance beam back into balance.

As the motor 266 rotates to move the rollers 31 and 32, it also moves through gearing 281 the rotor of the control transformer 275. When the rotor of the transformer reaches the electrical position corresponding to the position of the rotor of the selsyn transmitter 273, there is no voltage induced in the rotor winding 275b of the control transformer and therefore no voltage signal is fed to the amplifier 276. The control relays 278 and 277 are therefore de-energized, thereby opening contacts 277b and 278b and closing contacts 277a and 278a to stop the motor 266.

If the percentage shrinkage again changes and this change is reflected by a new difference in the voltage output between the two tachometer generators, another cycle of weight correction will occur.

In this manner, the weight compensating system, continuously checks the shrinkage and introduces a compensating error in the weighing scale which in turn initiates the weight control circuit to vary the speed of all the conveyors to vary the weight of the extruded material.

A control relay 282 is connected across lines L–5, L–11, and which, therefore, is energized only when micro-switch 220 is actuated by the cam plate 221. Energization of control relay 282 by the actuation of micro-switch 220 opens contacts 282a. Opening of contacts 282a breaks the circuit to control relays 279 and 280 and thereby prevents operation of motor 266 while micro-switch 220 is actuated.

Inasmuch as the weight control system operates only when micro-switch 220 is actuated, the opening of contacts 282a by actuation of micro-switch 220 will prevent motor 266 from moving the rollers 31 and 32 to make a correction in the weighing scale 21 while the weight control system is correcting the speed of the conveyors. By preventing the weight control system and the scale compensating system from being operated simultaneously, "hunting" by the motor 266 is prevented.

*Modification for using A. C. motors*

If it is desired to operate the various conveyors by A. C. constant speed motors, rather than by D. C. motors, the same control circuit with slight modifications may be used. In such a modification it is necessary to use some type of variable speed drive between the A. C. motors and the conveyors. One type of variable speed drive that may be used, is what is commonly known as a "Reeves" drive. Such a drive is shown in Fig. 7.

Figure 7:
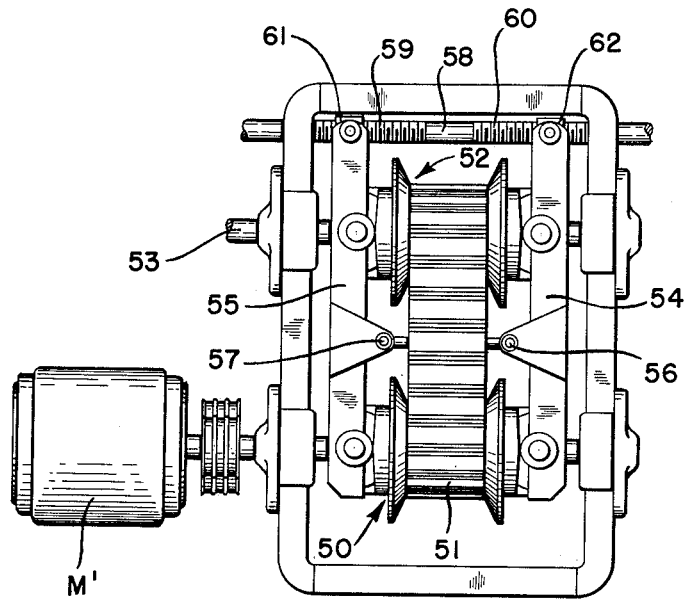
Fig. 7 is a plan view of a variable speed drive used in modifying the control system for use with A. C. constant speed conveyor motors.

Referring to Fig. 7, there is shown a conventional "Reeves" drive including a variable pitch pulley sheave 50 which is driven by an A. C. constant speed motor M', a driving belt 51, and a variable pitch pulley sheave 52, which drives output shaft 53. The pitch of the sheaves 50 and 52 and therefore the speed ratio is varied by changing the spacing between their individual tapered flanges which are slidably mounted on their respective shafts. The spacing is varied by actuating links 54 and 55 which are pivotally mounted intermediate their lengths at 56 and 57 and are pivotally connected to the flanges of the sheaves. By pivoting the links toward or away from each other the flanges on one sheave will be moved in one direction while the flanges on the other sheave will be moved in the other direction, thereby changing the speed ratio between the motor M' and the output shaft 53. The links 54 and 55 are actuated by a threaded shaft 58 which has two threaded portions 59 and 60, one right hand and one left hand. The threaded portions 59 and 60 are threaded into threaded nuts 61 and 62, pivotally connected to the ends of the links 54 and 55. Rotation of shaft 58, therefore, moves the actuating links 54 and 55 to vary the pitch of the sheaves and therefore the speed ratio.

In utilizing such a variable speed drive in the present invention, an A. C. constant speed motor and a variable speed drive of the type above described is substituted for D. C. motor M–1. The generator 201 is eliminated as well as rheostats 216, 250, 251 and 252. A variable speed drive is also substituted for each of the motors M–2, M–3 and M–4. The A. C. constant speed motor is connected to the input shaft of the first variable speed drive and the output shaft of the same drive is connected to the input shafts of the subsequent "Reeves" drives. The output shaft of each of the "Reeves" drives is connected to one of the conveyors and the shafts which originally moved the sliders on the rehostats 216, 250, 251 and 252 are connected to the threaded actuating shaft 58 of the variable speed drives.

Figure 8:
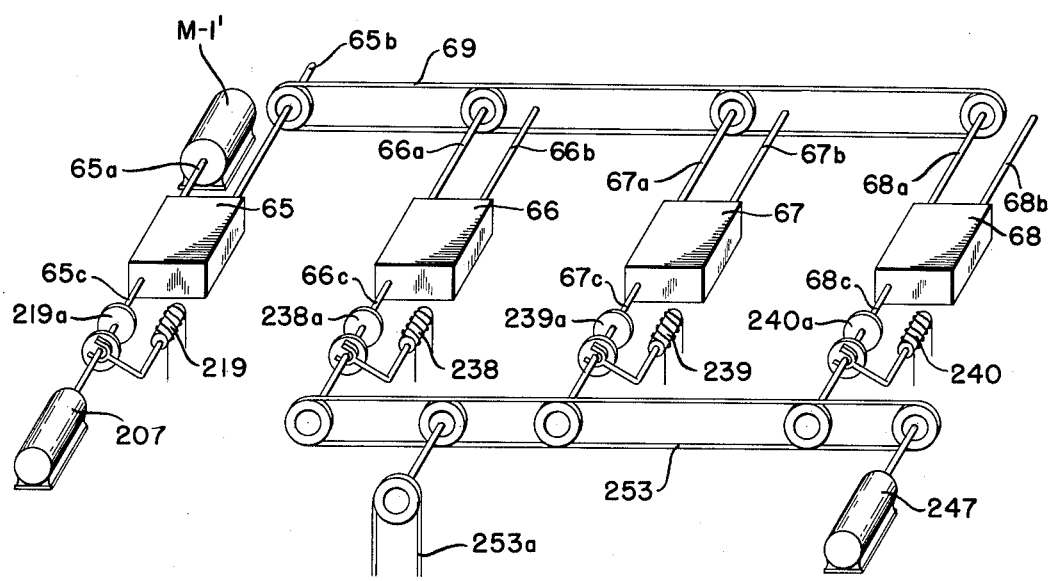
Fig. 8 is a schematic drawing showing how variable speed drives of the type shown in Fig. 7 can be incorporated in the control system, so that A. C. constant speed conveyor motors can be utilized.

Such a substitution is shown in Fig. 8 in which an A. C. motor M–1' is substituted for the D. C. motor M–1. The A. C. motor M–1' is connected to the input shaft 65a of a "Reeves" drive 65. The output shaft 65b is connected to the input shafts 66a, 67a and 68a of similar "Reeves" drives 66, 67 and 68 respectively by means of a chain drive 69. By connecting the output shafts 65b, 66b, 67b and 68b respectively to conveyors 13, 18, 15 and 16, the speeds of these conveyors can be changed simultaneously by operation of the threaded actuating shaft 65c of the "Reeves" drive 65. Actuating shaft 65C is operated by the servo motor 707 of the weight control circuit which originally moved the slider of the rheostat 216 in the weight control circuit using D. C. motors. In this manner the speeds of all the conveyors are increased or decreased in accordance with a weight deviation in the extruded stock from standard, to thereby correct the weight.

The actuating shafts 66c, 67c and 68c of the "Reeves" drives 66, 67 and 68 are rotated selectively by servomotor 247 through clutches 238a, 239a and 240a and chain drive 253 in the same manner that the sliders of rheostats 250, 251 and 252 in the tension control circuit were moved, to thereby vary the speed ratio of the output shafts of the "Reeves" drives 66, 67 and 68 and therefore the speeds of the individual conveyors driven thereby to correct the tension in the extruded material.

The modified control system as above described otherwise operates the same as the D. C. conveyor motor system.

*Modification of the loop or tension control circuit*

Figure 9:
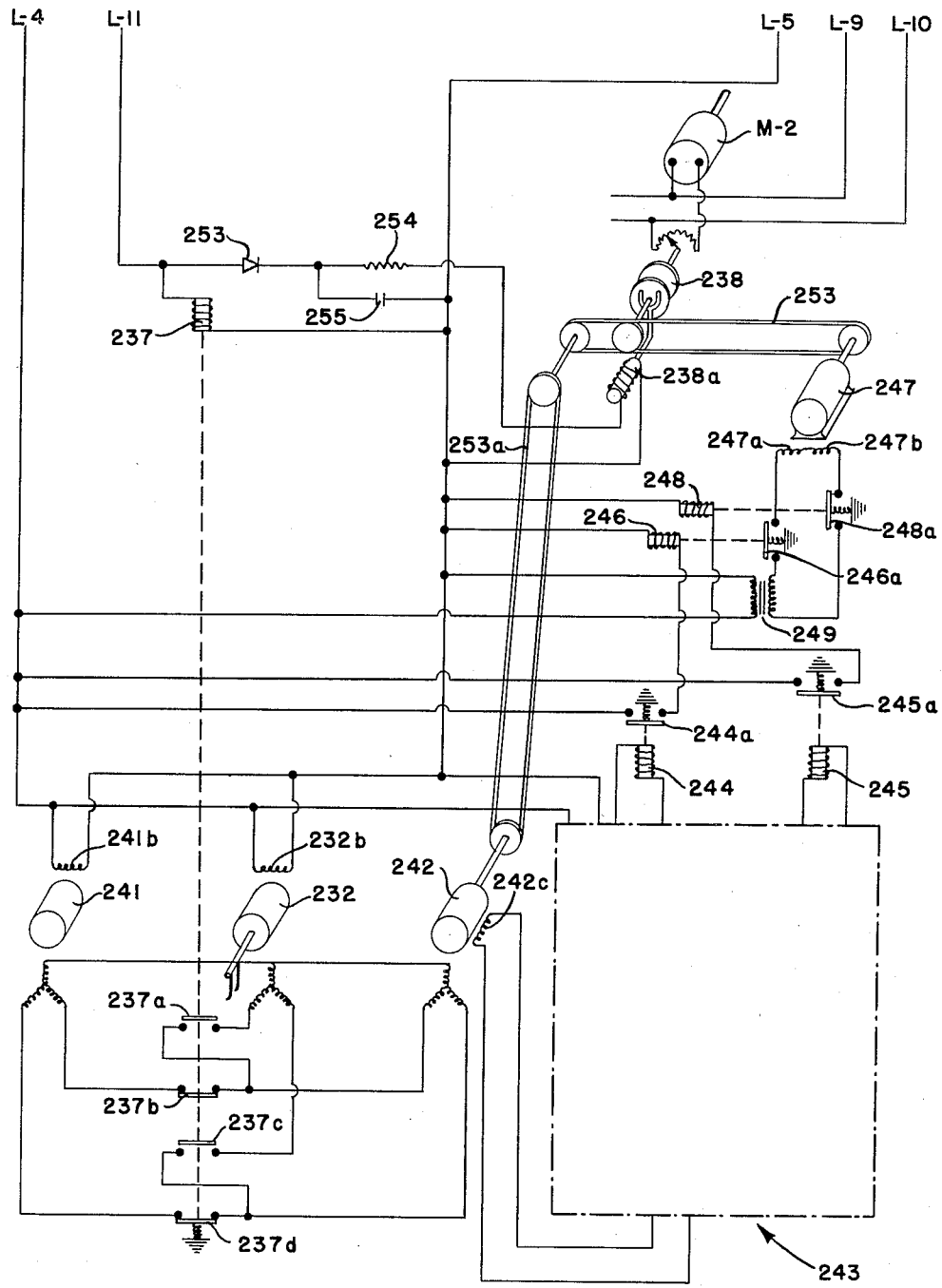
Fig. 9 is an elementary wiring diagram showing a modification of the diagram of Fig. 6.

Referring to Fig. 9, there is shown a modification of the loop or tension control circuit. According to this modification there is provided an independent, duplicate control circuit for each of the control selsyn transmitters 232, 233 and 234 so that each control selsyn controls the speed of only one conveyor motor. This is in contrast to the integrated control circuit of Fig. 6 which as previously described will vary the speed of all or less than all of the conveyor motors simultaneously depending upon which of the control selsyn transmitters is energized.

In Fig. 9, there is shown the modified circuit for only control selsyn 232. The circuits for control selsyns 233 and 234 are merely duplicates of this circuit, so a description of the circuit for control selsyn 232 will suffice for all.

The circuit of Fig. 9 is essentially the same as that of Fig. 6 except that the control selsyns 233 and 234, rheostats 251 and 252, clutch solenoids 239A and 240A and the inter-connecting solenoid operated switches have been eliminated. The same reference numerals have been used to identify the same elements in Figs. 6 and 9. This circuit functions in the same manner as the circuit of Fig. 6 to vary the speed of only conveyor motor M-2 when a change of tension occurs in the extruded material as it leaves the conveyor 14. The speeds of conveyor motors M-3 and M-4 are not varied by this circuit because their inter-connecting switches have been eliminated.

The circuit of Fig. 9 is connected across microswitch 220 (Fig. 5) and is energized each time that microswitch 220 is closed by cam 221. Duplicate circuits (not shown) are connected across microswitches 236 and 237 to vary the speeds of conveyor motors M-3 and M-4. In this manner duplicate but independent tension control circuits for each of the conveyor motors M-2, M-3 and M-4 are sequentially energized as the microswitches 220, 236 and 237 are sequentially actuated by the cam 221 to correct the tension in the extruded material at a plurality of points along the conveyor series.

The advantages of having duplicate independent circuits for each of the control selsyns as shown in Fig. 9 rather than the integrated circuit of Fig. 6 are simplicity and ease of replacement.

*Conclusion*

While the above control system has been described in terms of its component parts, viz., the weight control system, the loop or tension control system, and the scale compensating system, it can readily be seen that these component parts form an integrated control system.

The scale compensating system depends on the loop or tension control system to maintain the individual conveyors at the proper speeds to maintain the extruded material at substantially zero tension, so that the difference in speed between the first and last conveyors will be proportional to the change in length due to shrinkage or stretching of the extruded material.

The scale compensator is integrated with the weight control system to introduce a compensating error therein, so that it will correct or vary the weight of the extruded material.

The integrated control system accurately controls the extruded material, so that material as delivered at the end of the conveyor system will have substantially no tension and will be of a predetermined weight per unit of length. The control system may be used in any plastic extruding apparatus where it is desired to control the weight and tension in the extruded material. The control system, is particularly useful in the extrusion of rubber, commonly known as "tubing."

It is to be understood that the above description and accompanying drawings is for the purpose of illustration only and not by the way of limitation and changes and modifications may be made therein without departing from the spirit and the scope of the invention.

Having thus described our invention, what we claim and desire to protect by Letters Patent is:

1. In a conveyor system for conveying continuously extruded material from an extruding die, said conveyor system having a series of individual conveyors and means for independently driving each conveyor, a control system comprising, means adjacent the extruding die for detecting a weight deviation in the extruded material from a predetermined standard, control means operated by said weight deviation detecting means for simultaneously varying the speeds of all the conveyor driving means to correct the weight of the extruded material, means adjacent the conveyors at a plurality of points along the conveyor system for detecting a tension deviation in the extruded material, control means operated by said tension deviation detecting means for varying the speed of the individual conveyor driving means as necessary to correct the tension and means responsive to the difference in speed of the first and last conveyors in the series for introducing a compensating correction in the second named means to compensate for the changes in weight per unit of length of extruded material due to shrinkage in its travel along the conveyor system.

2. In a conveyor system for conveying continuously extruded material from an extruding die, said conveyor system having a series of spaced individual conveyors and means for independently driving each conveyor, a control system comprising, means positioned at a point adjacent the extruding die for supporting a predetermined length of the extruded material, said means being movable in response to a deviation in weight of the extruded material from a predetermined standard, control means responsive to movement of said supporting means for simultaneously varying the speed of all the conveyor driving means to correct the weight of the extruded material, movable means engaging the material at a plurality of positions along the conveyor system where the material is unsupported between the individual spaced conveyors, control means responsive to the movement of said movable means from a standard position occasioned by a change in tension of extruded material for varying the speed of the individual conveyor driving means as necessary to correct the tension, and means responsive to the difference in speed of the first and last conveyors in the conveyor series for varying the length of extruded material supported by said supporting means whereby a compensating correction is introduced in said first named control means to vary the speeds of the conveyor driving means to change the weight of extruded material to compensate for the change in weight due to shrinkage in the material during the travel along the conveyor system.

3. In a conveyor system for conveying continuously extruded material from an extruding die, said conveyor system having a series of spaced conveyors and means for driving the individual conveyors, a control system comprising, adjustable spaced supporting means, means adjacent the extruding die for weighing the length of extruded material supported between said spaced supporting means including means movable in response to and proportionate to a deviation in weight of the extruded material from a predetermined standard weight, control means responsive to the movement of said movable means to vary the speed of the conveyor driving means to correct the weight of the extruded material, means for constantly engaging the extruded material at a plurality of points where the material sags between the conveyors, and movable in response to a change in the depth of sag occasioned by a change in tension in the material, control means responsive to the movement from a predetermined position of said means for engaging the extruded material to increase the speed of the individual conveyor driving means to vary the tension in the material and therefore the depth of sag which said movable means are moved back to said predetermined position, and means responsive to the difference in speed of the first and last conveyors in the conveyor series for varying the spacing between said supporting means to thereby vary the length of material weighed by said weighing means whereby a compensating correction is introduced into said weighing means to compensate for the change in weight in the material due to shrinkage.

4. In a conveyor system for conveying continuously extruded material from an extruding die said conveyor system having a series of individual, spaced conveyors and means for independently driving the individual conveyors, a control system comprising, spaced supporting means positioned adjacent said extruding die, a weighing scale for continuously weighing extruded material supported between said spaced supporting means, said weighing scale having a balance beam, control means responsive to movement of the balance beam for varying the speed of all the conveyor driving means, feeler arms for engaging the extruded material at the points where the material sags between the spaced conveyors, said feeler arms being movable in response to a change in the depth of sag occasioned by a change of tension in the material, control means responsive to the movement of the feeler arms from a predetermined point for varying the speed of the individual conveyors to vary the tension in the extruded material and return the feeler arms to said predetermined point, and means responsive to the difference in speed of the first and last conveyor driving means for varying the spacing between said spaced supporting means to vary the length of the extruded material weighed by said weighing means to thereby introduce a compensating correction in said weighing means to compensate for the change in weight due to shrinkage of the extruded material in its travel along the conveyor series.

5. In a conveyor system for conveying continuously extruded material from an extruding die, said conveyor system having a series of spaced conveyors and means for driving each of said conveyors, a control system comprising means for continuously weighing a predetermined length of extruded material and varying the speed of all the conveyor driving means when the weight of the extruded material varies from a predetermined standard weight, individual means positioned at a plurality of points along the conveyor series and movable in response to a change in depth of the sag of the extruded material at the spaces between the conveyors, control means associated with each of said individual means, means for sequentially actuating each of said control means, said control means serving to vary the speed of all conveyor driving means of the individual conveyors more remote from the extruding die than the individual means that the control means is associated with and in proportion to the movement of the individual means, and means responsive to the difference in speed of the first and last conveyors in the series for introducing a compensating correction in said weighing means to compensate for the change in weight due to shrinkage of the extruded material.

6. In a conveyor system for conveying continuously extruded material from an extruding die, said conveyor system having a series of spaced individual conveyors and means for independently driving each conveyor, a control system comprising, spaced supporting means adjacent the extruding die, a weighing scale for weighing a length of extruded material supported between said supporting means, said weighing scale having a balance beam, a differential transformer, a movable iron core for the transformer, said core being attached to said balance beam and movable thereby whereby a signal voltage will be introduced in the secondary windings of the transformer proportionate to the amount of movement of the iron core, control means responsive to said signal voltage to vary the speed of all the conveyor driving means, detecting means positioned at a plurality of points along the conveyor system for detecting a change in tension of the extruded material from a predetermined standard, control means associated with said detecting means for varying the speed of the individual conveyors to maintain a predetermined standard tension along the length of the material, and means responsive to the difference in speed between the first and last conveyors for varying the spacing of said spaced supporting means to introduce a compensating correction in the weighing scale to thereby compensate for changes in weight due to shrinkage of the extruded material.

7. In a conveyor system for conveying continuously extruded material from an extruding die, said conveyor system having a series of individual, spaced conveyors, and means for independently driving each conveyor, a control system comprising, adjustable, spaced supporting means positioned adjacent the extruding die, a weighing scale for weighing a length of the extruded material supported between said spaced supporting means, said weighing scale having a balance beam, a differential transformer, said transformer having two secondary windings, a resistor connected across one of said windings, a potentiometer connected across the other of said windings, a center tap for said resistor, a slider for said potentiometer, a movable iron core for said transformer, said core being attached to said balance beam and movable therewith whereby a signal voltage will exist between said center tap and said slider proportional to the amount of movement of said iron core, means including a servomotor operated by said voltage signal, said slider being connected to said servomotor and moved thereby until the voltage between the slider and said center tap is zero, means actuated by said servomotor to vary the speed of all the conveyor driving means, and means for disconnecting said servomotor from said means for varying the speed of the conveyor driving means and for resetting the slider of the potentiometer to the center of the range of the potentiometer, detecting means positioned at a plurality of points along the conveyor system for detecting a change in tension in the extruded material, control means associated with said detecting means for varying the speeds of the individual conveyors to maintain a predetermined standard tension along the length of the material, and means responsive to the difference in speed between the first and last conveyors for varying the spacing between said supporting means to introduce a compensating error in the weighing scale to thereby compensate for changes in weight due to shrinkage of the extruded material.

8. In a conveyor system for conveying continuously extruded material from an extruding die, said conveyor system having a series of individual, spaced conveyors, and means for independently driving each conveyor, a control system comprising, spaced supporting means adjacent the extruding die, a weighing scale for weighing a length of the extruded material supported between said spaced supporting means, said weighing scale having a balance beam, a differential transformer, said transformer having two secondary windings, a resistor connected across one of said windings, a potentiometer connected across the other of said windings, a center tap for said resistor, a slider for said potentiometer, a movable iron core for said transformer, said iron core being attached to said balance beam and movable therewith whereby a signal voltage will exist between said center tap and said slider proportional to the amount of movement of said iron core, means including a servomotor operated by said voltage signal, said slider being connected to said servomotor and moved thereby until the voltage between the slider and said center tap is zero, means actuated by said servomotor to vary the speeds of all the conveyor driving means, means for periodically disconnecting said servomotor from said means for varying the speeds of the conveyor driving means and for disconnecting said potentiometer from across said second named transformer winding and connecting said potentiometer across the first named winding whereby a voltage signal will again exist between said slider and said center tap and said servomotor will be driven thereby to reset the slider to the center of the range of the potentiometer so that there will be zero voltage between the slider and the center tap, detecting means positioned at a plurality of points along the conveyor system for detecting a change in tension in the extruded material, control means associated with said detecting means for varying the speeds of the individual conveyors to maintain a predetermined standard tension, and means responsive to the difference in speed between the first and last conveyors for varying the spacing between said supporting means to introduce a compensating correction in the weighing scale to thereby compensate for changes in weight due to shrinkage of the extruded material.

9. In a conveyor system for conveying continuously extruded material from an extruding die, said conveyor system having a series of individual spaced conveyors and individual driving means for independently driving each conveyor, a control system comprising, means responsive to a change in weight per unit of length of the extruded material from a predetermined standard for simultaneously varying the speed of all the conveyor driving means to correct the weight of the extruded material, means for detecting a variation in the tension in the extruded material at a plurality of points along the conveyor series and for varying the speed of the individual conveyor driving means to correct the tension, said tension detecting means including feeler arms for engaging the extruded material at points where the material sags between the spaced conveyors, a selsyn transmitter for each of said feeler arms, each of said feeler arms being connected to the rotor of one of said selsyn transmitters whereby the rotor will be rotated by said feeler arm when said feeler arm is moved from a predetermined position in response to a change in depth of sag occasioned by a change in tension in the material, control means responsive to the movement of said selsyn transmitter rotor to vary the speed of the individual driving means to correct the tension in the material and means responsive to a difference in speed in the first and last conveyors in the conveyor series for introducing a compensating error in the second named means responsive to a change in weight to thereby simultaneously vary the speed of all the conveyor driving means whereby the material when delivered at the end of a conveyor system will be of a predetermined standard weight per unit of length.

10. In a conveyor system for conveying continuously extruded material from an extruding die, said conveyor system having a series of individual conveyors and means for independently driving each conveyor, a control system comprising, adjustable, spaced supporting means, means adjacent the extruding die for weighing the length of extruded material supported between said supporting means, control means actuated by said weighing means to vary the speed of all the conveyor driving means, means adjacent the conveyors at a plurality of points along the conveyor system for detecting tension deviations in the extruded material, control means operated by said tension deviation detecting means for varying the speed of the individual conveyor driving means as necessary to correct the tension along the length of the material and means including a tachometer generator connected to the first conveyor in the conveyor series, a tachometer generator connected to the last conveyor in the conveyor series, means for varying the spacing between said space supporting means, means responsive to the difference in output of said tachometer generators to actuate said means for varying the spacing between said spaced supporting means whereby a compensating correction will be introduced in said weighing means to compensate for changes in weight due to shrinkage in the extruded material.

11. In a conveyor system for conveying continuously extruded material from an extruding die, said conveying system having a series of individual, spaced, conveyors and means for independently driving each conveyor, a control system comprising, adjustable spaced supporting means, means adjacent the extruding die for weighing the length of extruded material supported between said supporting means, control means actuated by said weighing means for varying the speed of all the conveyor driving means when the weight of the extruded material deviates from a predetermined standard, means adjacent the conveyors at a plurality of points along the conveyor system for detecting a tension deviation in the extruded material, control means operated by said tension deviation detecting means for varying the speed of the individual conveyor driving means as necessary to correct the tension, means including a tachometer generator driven by the first conveyor in the conveyor series, a tachometer generator driven by the last conveyor in said conveyor series, the output of one tachometer generator being connected across a resistor, the output of the other tachometer generator being connected across a potentiometer, a center tap for the resistor, a slider for the potentiometer, means including a servomotor operated by the existence of a voltage difference between said center tap and said slider, said slider being connected to said servomotor and driven thereby to move the slider until the voltage difference between said slider and said center tap is zero, and means operated by said servomotor for varying the spacing between said supporting means to introduce a compensating error in said weighing means to compensate for changes in weight due to shrinkage of the extruded material.

12. In a conveyor system for conveying continuously extruded material from an extruding die, said conveyor system having a series of spaced individual conveyors, and means for independently driving each conveyor, a control system comprising, adjustable spaced supporting means adjacent said extruding die, weighing means for continuously weighing the extruded material supported between said space supporting means, control means actuated by said weighing means for varying the speed of all the conveyor driving means when the weight of the extruded material varies from a predetermined standard, detecting means adjacent the conveyors at a plurality of points along the conveyor system for detecting tension deviations in the extruded material, control means operated by said tension deviation detecting means for varying the speed of the individual conveyor driving means as necessary to correct the tension, means including a tachometer generator driven by the first conveyor in said conveyor series, a tachometer generator driven by the last conveyor in said conveyor series, the output of one tachometer generator being connected across a resistor, the output of the other tachometer generator being connected across a potentiometer, a center tap for the resistor, a slider for the potentiometer, means including a servomotor operated by the existence of a voltage difference between said center tap and said slider, said slider being connected to said servomotor and driven thereby to move the slider until the voltage difference between said slider and said center tap is zero, a selsyn transmitter, the rotor of said selsyn transmitter being connected to said servomotor and driven thereby, a control transformer, the field windings of said servomotor being connected to the field windings of said selsyn transmitter, whereby a signal voltage will be induced in the rotor windings of the control transformer when the rotor of the selsyn transmitter is moved out of electrical alignment with the rotor of the control transformer, means actuated by the signal voltage to vary the spacing between the spaced supporting means to introduce a compensating error in the weighing means, and for moving the rotor of the control transformer into electrical alignment with said rotor of said selsyn transmitter so that no voltage signal is induced in the rotor windings of the control transformer.

13. In a conveyor system for conveying continuously extruded material from an extruding die, said conveyor system having a series of individual spaced conveyors and means for independently driving each conveyor, a control system comprising, means for detecting variations in the tension in the extruded material at a plurality of points along the conveyor series and for varying the speeds of the individual conveyor driving means to correct the tension, said tension detecting means including feeler arms for engaging the extruded material at points where the material sags between the spaced conveyors, each of said feeler arms being connected to the rotor of a selsyn transmitter whereby the rotor will be rotated by said feeler arm when said feeler arm moves from a predetermined position in response to a change in depth of sag occasioned by a change in tension in the material, means for sequentially connecting the field windings of each of said selsyn transmitters to the field windings of a control transformer whereby a signal voltage will be induced in the rotor windings of the control transformer, means including a servomotor operated by said signal voltage, means actuated by said servomotor for varying the speeds of the conveyor driving means of all the conveyors more remote from said extruding die than said feeler arm connected to the rotor of the selsyn transmitter the field windings of which are connected to the field windings of the control transformer, the rotor of said control transformer being connected to said servomotor and driven thereby until the rotor is in electrical alignment with the rotor of the selsyn transmitter to which it is connected, means for periodically disconnecting the windings of the control transformer from the field windings of each of the selsyn transmitters and connecting the windings of the control transformer with the windings of a reference stationary rotor selsyn transmitter and for disconnecting the servomotor from said means for varying the speeds of the individual conveyor driving means whereby said servomotor will reset the rotor of the control transformer to be in electrical alignment with the rotor of said reference selsyn transmitter prior to the connection of the field windings of another of said selsyn transmitters to said control transformer.

14. In a conveyor system for conveying continuously extruded material from an extruding die, said conveyor system having a series of individual conveyors and means for independently driving each conveyor, a control system comprising, adjustable, spaced supporting means, means adjacent the extruding die for weighing the extruded material supported between said supporting means, control means actuated by said weighing means to vary the speed of all the conveyor driving means, means including a tachometer generator connected to the first conveyor in the conveyor series, a tachometer generator connected to the last conveyor in the conveyor series, means for varying the spacing between said space supporting means, and means responsive to the difference in output of said tachometer generators to actuate said means for varying the spacing between said spaced supporting means whereby a compensating correction will be introduced in said weighing means to compensate for change in the weight due to shrinkage in the extruded material.

15. In a conveyor system for conveying continuously extruded material from an extruding die, said conveying system having a series of individual conveyors and means for independently driving each conveyor, a control system comprising, adjustable, spaced supporting means, means adjacent the extruding die for weighing the length of extruded material supported between said supporting means, control means actuated by said weighing means for varying the speed of all the conveyor driving means when the weight of the extruded material deviates from a predetermined standard, means including a tachometer generator driven by the first conveyor in the conveyor series, a tachometer generator driven by the last conveyor in said conveyor series, the output of one tachometer generator being connected across a resistor, the output of the other tachometer generator being connected across a potentiometer, a center tap for the resistor, a slider for the potentiometer, means including a servomotor operated by the existence of a voltage difference between said center tap and said slider, said slider being connected to said servomotor and driven thereby to move the slider until the voltage difference between said slider and said center tap is zero and means operated by said servomotor for varying the spacing between said supporting means to introduce a compensating error in said weighing means to compensate for changes in weight due to shrinkage of the extruded material.

16. In a conveyor system for conveying continuously extruded material from an extruding die, said conveyor system having a series of spaced individual conveyors, and means for independently driving each conveyor, a control system comprising, adjustable spaced supporting means adjacent said extruding die, weighing means for continuously weighing the extruded material supported between said spaced supporting means, control means actuated by said weighing means for varying the speed of all the conveyor driving means when the weight of extruded material varies from a predetermined standard, means including a tachometer generator driven by the first conveyor in said conveyor series, a tachometer generator driven by the last conveyor in said conveyor series, the output of one tachometer generator being connected across a resistor, the output of the other tachometer generator being connected across a potentiometer, a center tap for the resistor, a slider for the potentiometer, means including a servomotor operated by the existence of a voltage difference between said center tap and said slider, said slider being connected to said servomotor and driven thereby to move the slider until the voltage difference between said slider and said center tap is zero, a selsyn transmitter, the rotor of said selsyn transmitter being connected to said servomotor and driven thereby, a control transformer, the field windings of said servomotor being connected to the field windings of said selsyn transmitter whereby a signal voltage will be induced in the rotor windings of the control transformer when the rotor of the selsyn transmitter is moved out of electrical alignment with the rotor of the control transformer, means actuated by the signal voltage to vary the spacing between the space supporting means to introduce a compensating error in the weighing means and for moving the rotor of the control transformer into electrical alignment with said rotor of said selsyn transmitter so that no voltage signal is introduced in the rotor winding of the control transformer.

17. In a conveyor system for conveying continuously extruded material from an extruding die, said conveying system having a series of spaced conveyors and means for driving the individual conveyors, a control system comprising, adjustable spaced supporting means, means adjacent the extruding die for weighing the length of extruded material supported between said spaced supporting means, control means actuated by said weighing means for varying the speed of all the individual conveyor driving means, and means responsive to the difference in speed between the first and last conveyors in the conveyor series for varying the spacing between said supporting means to thereby vary the length of material weighed by said weighing means whereby a compensating correction is introduced into said weighing means to compensate for the change in weight in the material due to shrinkage.

18. In a conveyor system for conveying continuously extruded material from an extruding die, said conveyor system having a series of individual conveyors and individual conveyor driving means for independently driving each conveyor, a control system comprising, means adjacent the conveyors at a plurality of points along the conveyor system for detecting a tension deviation in the extruded material, control means operated by said tension deviation detecting means for varying the speed of the individual conveyor driving means as necessary to correct the tension and means responsive to the difference in speed of the first and last conveyors in the conveyor series for varying the speed of all the conveyor driving means simultaneously.

19. In a conveyor system for conveying continuously extruded material from an extruding die, said conveyor system having a series of individual conveyors and individual conveyor driving means for independently driving each conveyor, a control system comprising means responsive to a change in tension of the extruded material from a predetermined standard for varying the speed of the individual conveyor driving means as necessary to correct the tension in the extruded material and control means responsive to the difference in speed of the first and last conveyor in the series for simultaneously varying the speed of all the conveyor driving means whereby the material when delivered at the end of the conveyor system will be of a predetermined standard weight per unit of length.

20. In a conveyor system for conveying continuously extruded material from an extruding die, said conveyor system having a series of individual spaced conveyors and means for independently driving the individual conveyors, a control system comprising feeler arms for engaging the extruded material at the points where the material sags between the spaced conveyors, said feeler arms being movable in response to a change in the depth of sag occasioned by a change of tension in the material, control means responsive to the movement of the feeler arms from a predetermined point for varying the speed of the individual conveyors to vary the tension in the extruded material and return the feeler arms to said predetermined point, and means responsive to the difference in speed between the first and last conveyors in the conveyor series for varying the speeds of all the conveyor driving means simultaneously whereby the material when delivered at the end of the conveyor system will be of a predetermined standard weight per unit of length.

References Cited in the file of this patent

UNITED STATES PATENTS

| Number | Name | Date |
|---|---|---|
| 1,348,943 | Hallock | Aug. 10, 1920 |
| 1,687,339 | Lewellen | Oct. 9, 1928 |
| 2,051,781 | Brown | Aug. 18, 1936 |
| 2,156,895 | Godat | May 2, 1939 |
| 2,530,387 | Goertz | Nov. 21, 1950 |
| 2,544,467 | Michel | Mar. 6, 1951 |
| 2,613,341 | Tawney | Oct. 7, 1952 |
| 2,632,872 | Warsher | Mar. 24, 1953 |